United States Patent [19]
Schad et al.

[11] Patent Number: 6,056,536
[45] Date of Patent: May 2, 2000

[54] VALVE GATING APPARATUS FOR INJECTION MOLDING

[75] Inventors: Robert D. Schad, Toronto, Canada; Manfred Lausenhammer, Am Herrenberg; Arnold Mai, Irrel, both of Germany

[73] Assignee: Husky Injection Molding Systems Ltd., Bolton, Canada

[21] Appl. No.: 09/030,593

[22] Filed: Feb. 25, 1998

Related U.S. Application Data

[60] Provisional application No. 60/044,454, Mar. 20, 1997.

[51] Int. Cl.⁷ .................................................. B29C 45/23
[52] U.S. Cl. ............................................. 425/562; 425/566
[58] Field of Search .................................... 425/562, 563, 425/564, 565, 566, 577

[56] References Cited

U.S. PATENT DOCUMENTS

| | | | |
|---|---|---|---|
| 3,581,341 | 6/1971 | Perry et al. | 425/564 |
| 4,077,760 | 3/1978 | Sauer | 425/562 |
| 4,828,480 | 5/1989 | Smith | 425/562 |

FOREIGN PATENT DOCUMENTS

| | | |
|---|---|---|
| 1 296 332 | 5/1969 | Germany. |
| 61-024241 | 2/1986 | Japan. |
| 62-211119 | 9/1987 | Japan. |
| 63-147619 | 6/1988 | Japan. |
| 08142122 | 6/1996 | Japan. |

*Primary Examiner*—Tim Heitbrink
*Attorney, Agent, or Firm*—Fitzpatrick, Cella, Harper & Scinto

[57] ABSTRACT

A valve gating apparatus and method for injection molding includes at least one shutter disposed between the gate and the cavity melt channel into a mold cavity. The shutter is moved laterally, between a closed position wherein flow of melt from the nozzle into the cavity is inhibited, and an open position wherein flow of melt into the cavity is unimpeded by the shutter. Intermediate these two positions, the shutter can be employed to reduce the cross sectional area of the gate to throttle the gate. Embodiments are disclosed wherein one shutter or pairs of shutters are employed to gate the gate. Further, when pairs of shutters are employed, the shutters can abut each other in the close position or can overlie each other. This novel design prevents generation of waste material and eliminates the need to have devices for removing cold plugs.

14 Claims, 17 Drawing Sheets

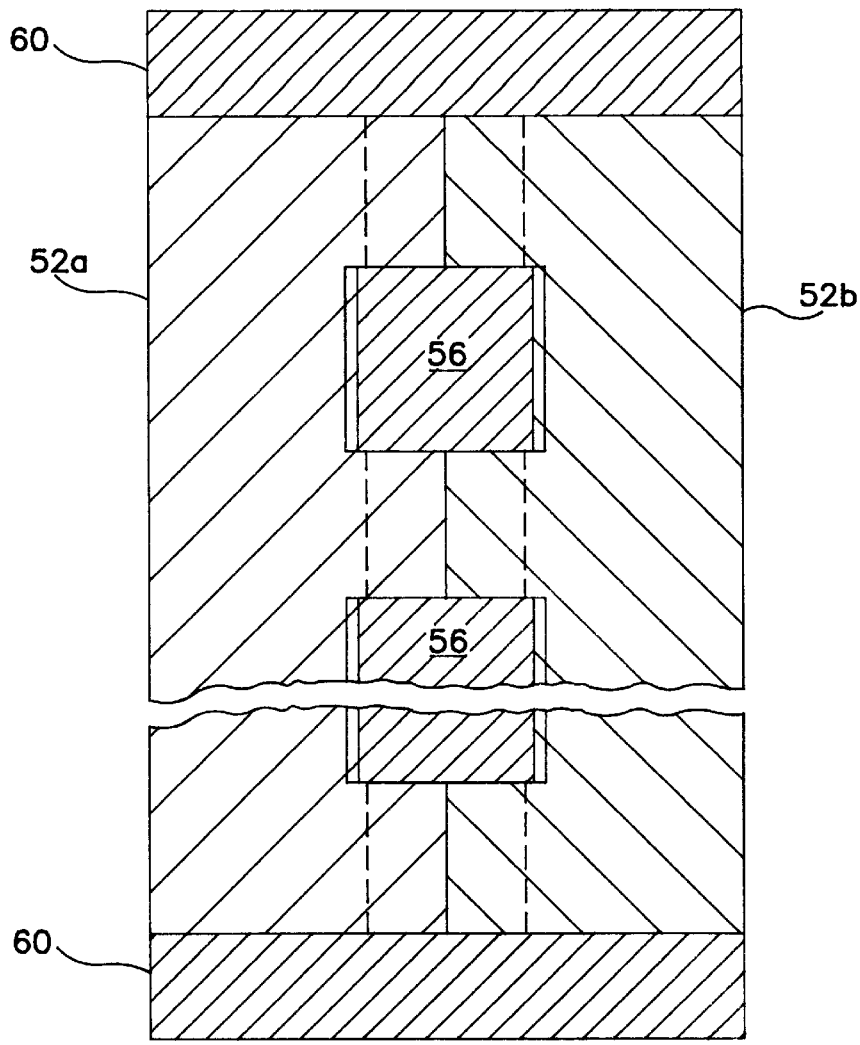
FIG. 4
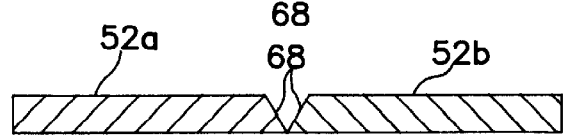
FIG. 5a
FIG. 5b
FIG. 5c
FIG. 5d

VALVE GATING APPARATUS FOR INJECTION MOLDING

This application claims the benefit of U.S. Provisional Application No. 60/044,454, filed on Mar. 20, 1997.

FIELD OF THE INVENTION

The present invention relates to a valve gating apparatus and a method of valve gating for use with injection molds. More specifically, the present invention relates to an apparatus and method for laterally gating the flow of molten materials from an injection-molding nozzle into a mold cavity.

BACKGROUND OF THE INVENTION

It is well known in the field of injection molding that some means must be provided to inhibit the flow of molten material into the cavity of a mold so that the mold may be cooled and opened to remove the molded part. There are essentially two broad categories of inhibiting techniques known in the field of injection molds, namely: thermal gating, wherein the gate at the exit of the nozzle is rapidly cooled at the completion of the injection operation to form a solid or semi-solid plug of the material being injected at the gate; and valve gating, wherein a mechanical means is employed to inhibit the flow of material being injected into the mold cavity. Each category has its own advantages and disadvantages relative to the other and numerous systems for thermal gating and for valve gating are known.

Valve gating systems are generally of one of two types, namely inline and lateral systems, although a wide variety of systems of each type have been developed. In inline systems, a valve stem aligned with the gate is moved, parallel to the direction of movement of molten material (generally referred to as "melt") through the gate, between a position wherein the stem extends into the gate to block further flow through the gate and a position wherein the stem is retracted from the gate to permit flow therethrough into the mold cavity. In order to be aligned with the gate, the valve stem is located inside the injection nozzle and is at least partially within the flow path of the melt.

For these, and other reasons, inline valve gating suffers from a variety of problems. One common problem is wear of the valve stem due to contact with the nozzle and/or gate, which can lead to misalignment of the stem and thus leaking or failure of the valve. Another common problem is the conversion of the melt from the tubular flow entering the nozzle to an annular (or other non-continuous) flow which is caused by the valve stem or other related components being within the melt flow. Such a non-continuous flow can result in weld or knot lines in the molded product produced as the melt flow recombines within the gate or mold cavity and this can result in weakened or unacceptable molded products. Some examples of relatively recent inline systems which attempt to address these and/or other problems include U.S. Pat. Nos. 4,412,807 to York, 4,925,384 to Manner and 5,254,305 to Fernandez et al.

In lateral valve gating systems, a valve member is moved across the melt flow before or after the gate to block or allow flow through the gate. While lateral gating systems can avoid the misalignment, reliability and divided melt flow problems of inline valve gating systems, they suffer from their own problems and disadvantages. For example, a lateral valve gating system, which is located too far from the mold cavity, can result in unacceptable sprue vestiges being formed on the molded parts.

Another problem with gating systems in general is that the melt material in the melt channel of the mold cavity, adjacent the gate, experiences a different cooling regime than the remainder of the melt in the cavity. Specifically, as the nozzle is heated to maintain the melt in a molten condition, the melt material in the melt channel of the mold cavity adjacent the gate is cooled less efficiently than the rest of material in the mold cavity as some heat is transferred from the melt in the gate. Many melt materials degrade or otherwise develop undesired characteristics when exposed to a poor cooling regime. For example, in the specific case of PET, the material can exhibit crystalinity when exposed to a poor cooling regime and/or increased levels of acid aldehyde can be produced.

U.S. Pat. No. 4,108,956 to Lee shows, in the embodiments of FIGS. 1, 2 and 3, a lateral gating mechanism comprising a valve gate in the form of a pair of slidable plates with a bore there through. When the bore in these plates is aligned with the gate, melt material can flow into the mold cavity from the nozzle. When the injection operation is complete, the plates are moved laterally to move the bore out of alignment with the gate and further flow of melt into the cavity is prevented. The patent teaches that the advantage afforded by the plates is that they provide thermal insulation between the gate in the nozzle and the cooled mold to inhibit undesired thermal transmission therebetween, thus mitigating the poor cooling of the melt in the mold cavity adjacent the gate. Accordingly, the plates are of selected thickness and materials to provide the desired thermal insulating characteristics. In fact, the patent teaches that a pair of plates, each overlying the other, are employed with the plate adjacent the manifold plate being formed of a thermally insulating material and the plate adjacent the mold being formed of a heat conductive material.

However, as with many other lateral gating mechanisms, the device taught in Lee suffers from some associated disadvantages. In particular, some melt material is carried in the bore in the plates when they are moved to the position to inhibit melt flow and this material forms a cold plug therein. This results in two disadvantages, namely that some melt material is wasted on each closing operation and that some provision must be made to remove and discard the cold plugs from the bore before the plates are returned to the position to enable melt flow. Generation of waste is unacceptable in man) applications such as when molding PET preforms or in a clean room environment. The addition of the means to remove and discard the cold plugs is not acceptable in a multi-cavity mold. Therefore, the Lee patent does not represent a feasible approach.

U.S. Pat. Nos. 3,288,903 to Hendry, 3,599,290 to Garner, 3,632,729 to Biefeldt and 3,809,519 to Garner shown other examples of known lateral gating systems. These patents are mostly used to regulate the flow of melt from an injection machine. Therefore, the disadvantages of Lee '956, which are common for in-mold gating only, do not represent a major problem.

U.K. Patent 1,369,744, while not teaching a lateral gating system, does show in the embodiments shown in FIGS. 1 through 8 of the reference, a pair of valves which are located upstream from the gate and which comprise lateral shuttles. These shuttles are forced from the closed position (i.e.— where melt flow is inhibited) to the open position by pressure exerted by the melt, which counteracts an applied hydraulic pressure. The valves are used to switch materials to be injected, and are not used to control melt flow out of the gate and into the cavity. Further, as the gate is well downstream of the shuttles, a significant amount of melt is downstream of the shuttles and large, undesired, sprue vestiges can result on molded parts as this melt material is still in contact with the mold cavity. Also, these shuttles are actuated by a pressure differential between a hydraulic cylinder and the melt flows. This actuating mechanism cannot provide an accurate gating of multiple nozzles and would not be suitable for location within an injection mold due to the volume occupied by the mechanism and as hydraulic leaks, which are inevitable with prolonged use, are not tolerable in a mold.

Another problem of all conventional gating systems is that the gate is of a constant size. Presently, in all of the gating systems of which the present inventor is aware, the cross-sectional area of the gate is constant and thus limits the rate of melt flow into a mold cavity. In some circumstances, it is desired to inject different materials and/or different amounts of those materials into the mold cavity, such as in coinjection situations. In such cases, the mold designer must select a gate size, which is a compromise between the optimal size for each material and/or amount of material.

In other circumstances, it is desired to inject a material or materials at different rates. For example, a cantilevered mold core such as that used in molding blow molding preforms from PET can be shifted laterally in a mold cavity by the melt material which enters the cavity at the beginning of the injection operation. In conventional systems, the cavity is filled at a substantially constant rate, as the cross-sectional area of the gate and the feed pressure of the melt from the injection machine are substantially constant. Accordingly, melt material enters the cavity at a substantially constant pressure and velocity. If the mold gate size could be altered, melt could initially enter the cavity at a reduced pressure and/or velocity until some melt surrounds a portion of the mold core and then the gate can be resized to allow the remaining melt to enter at a higher pressure and/or velocity.

Also, with the prior art gating systems when a mold cavity is changed to mold a different part, it can be required to change the gates of the mold to larger or smaller gates to accommodate the new melt flow requirements. If the size of the mold gate in the mold could be altered, the time required to change the cavities could be reduced.

It is desired to have an apparatus and method of lateral gating for use in injection molding operations which provides the advantages of lateral gating without at least some of the drawbacks normally associated therewith. Further, it is desired to have an apparatus and method of lateral gating which permits the cross-sectional area of the gate to be altered. This alteration of the cross-sectional area of the gate allows melt to be injected under different conditions, such as different flow rates and/or pressures.

SUMMARY OF THE INVENTION

It is an object of the present invention to provide a novel valve gating apparatus and method of valve gating for use in injection molding operations.

According to a first aspect of the present invention, there is provided a method of gating melt flow from the gate of an injection mold nozzle into a mold cavity, comprising the steps of:

(i) moving a shutter located between said mold gate and said mold cavity in a direction substantially perpendicular to the melt flow through said nozzle gate to establish fluid communication between said nozzle gate and said mold cavity;

(ii) injecting a desired amount of melt material from said injection mold nozzle through said nozzle gate into said mold cavity;

(iii) moving said shutter in said substantially perpendicular direction to interrupt said fluid communication to inhibit flow of melt from said nozzle;

(iv) cooling said melt in said mold cavity to form a molded part;

(v) opening said mold cavity and removing said part from said cavity;

(vi) closing said cavity; and (vii) repeating steps (i) through (vi) as desired.

According to another aspect of the present invention, there is provided a valve gating apparatus for an injection mold nozzle assembling including a melt channel and a nozzle gate, said valve gating apparatus being positioned between the nozzle gate and a mold cavity, comprising:

at least one shutter moveable between a first position wherein said shutter inhibits flow of melt material from said nozzle gate and a second position wherein said gate is in fluid communication with said mold cavity;

means to move said shutter substantially perpendicular to the direction of melt flow through said nozzle gate between said first and second positions.

The present invention provides a novel lateral valve gating apparatus and method of operating an injection mold. Thermal insulating properties can be enhanced between cooling melt in the mold cavity and hot melt in the injection nozzle and sprue vestiges can be reduced or eliminated. The valve gates constructed in accordance with the present invention have good reliability and are not subject to exceptional wear. Further, the gate of a nozzle can be throttled to a reduced cross-sectional area to permit injected flow characteristics to be established as desired. Also, each melt channel of a multi-material nozzle can be gated as desired.

The present invention also provides the ability to gate multiple mold nozzles with a single shutter, or pair of shutters. This can render the present invention particularly size and cost efficient. Specifically, a shutter, or pair of shutters, require much less volume within an injection mold than many prior art valve gating systems which required separate actuators for each nozzle. This can allow a mold or machine designer to locate nozzles in a closer spacing and/or employ more nozzles than otherwise. Further, the shutters, or pairs of shutters, in accordance with the present invention are less expensive to deploy, due largely to the simplicity of the fabrication of the shutters, and the reduced number of actuators required to operate the shutters and can reduce the cost of constructing such a machine or mold. Further, by employing a shutter or pair of shutters to gate multiple nozzles, accurate and easily controlled gating of those multiple nozzles is ensured.

Also, an important benefit is that the shutter or shutters employed with the present invention do not carry melt material when closed, material waste at the valve gate is reduced or eliminated and special means for removing and disposing of such waste material need not be provided.

BRIEF DESCRIPTION OF THE DRAWINGS

Preferred embodiments of the present invention will now be described, by way of example only, with reference to the attached Figures, wherein:

FIG. 4 shows a section taken along line 4—4 of FIG. 3;

FIGS. 5(a) through 5(d) show configurations of shutters in accordance with the present invention;

DETAILED DESCRIPTION OF THE INVENTION

Figure 1:
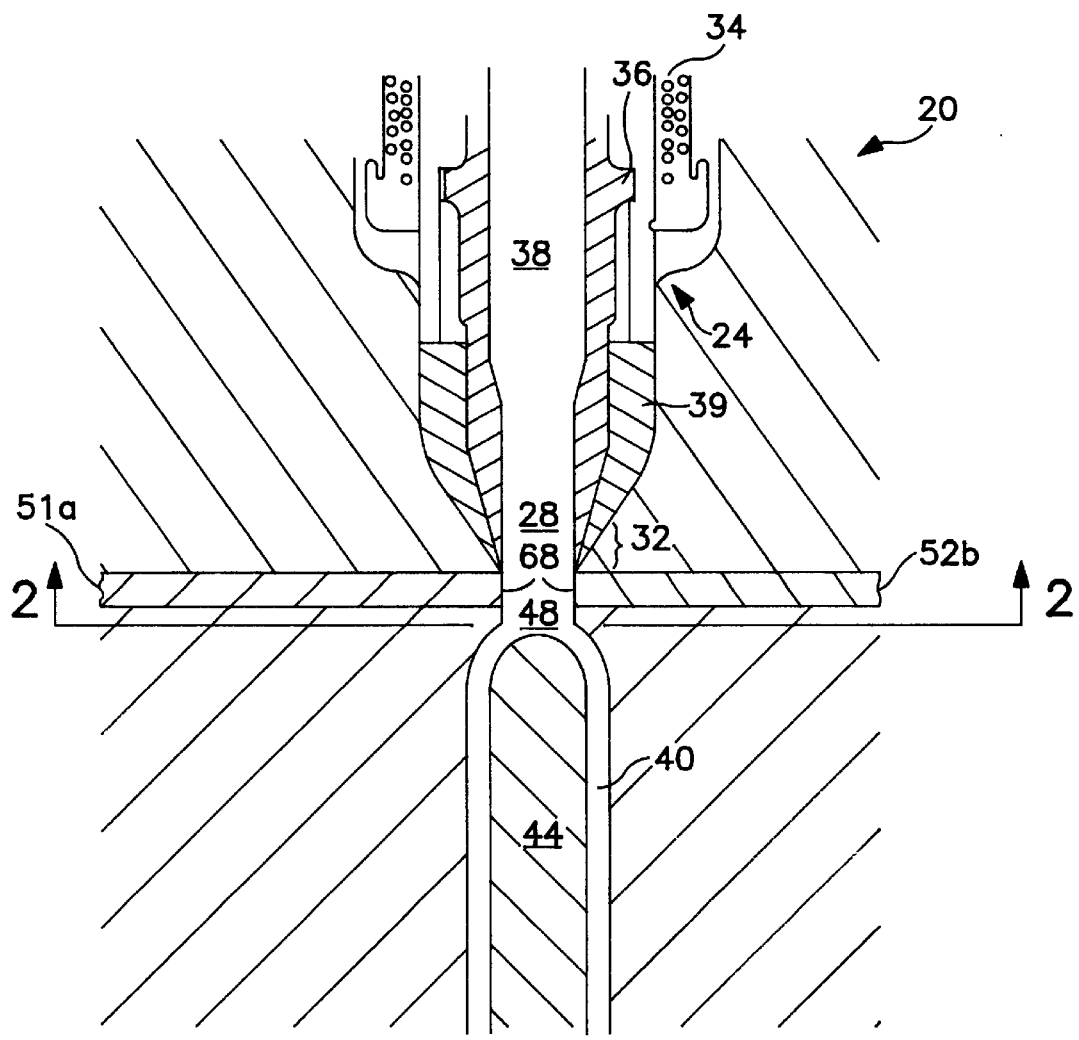
FIG. 1 shows a cross section of a portion of a injection nozzle and a lateral gate element comprising a pair of shutters, in accordance with a first embodiment of the present invention, adjacent a mold cavity and wherein the shutter is in an open position.

A portion of an injection mold in accordance with a first embodiment of the present invention is indicated generally at 20 in FIG. 1. FIG. 1 shows a hot runner injection nozzle assembly 24, for use in mold 20. A mold gate 28 is adjacent the nozzle tip 32 of nozzle 36. Nozzle 36 is in thermal contact with one or more heater elements 34, which can be wound, band, ceramic or any other suitable heater element, and includes a melt channel 38 through which melt material from an injection machine flows. The melt material exits melt channel 38 in nozzle 36 through gate 28 and an insulating member 39 helps thermally isolate the melt from the cold mold plate 20.

A mold cavity 40 with a mold core 44 is connected to mold gate 28 by an entrance 48 to mold cavity 40. Between the nozzle tip 32 and entrance 48 to mold cavity 40 is a valve, formed of innovative lateral gate shutters 52a, 52b in accordance with a first embodiment of the present invention.

Figure 2:
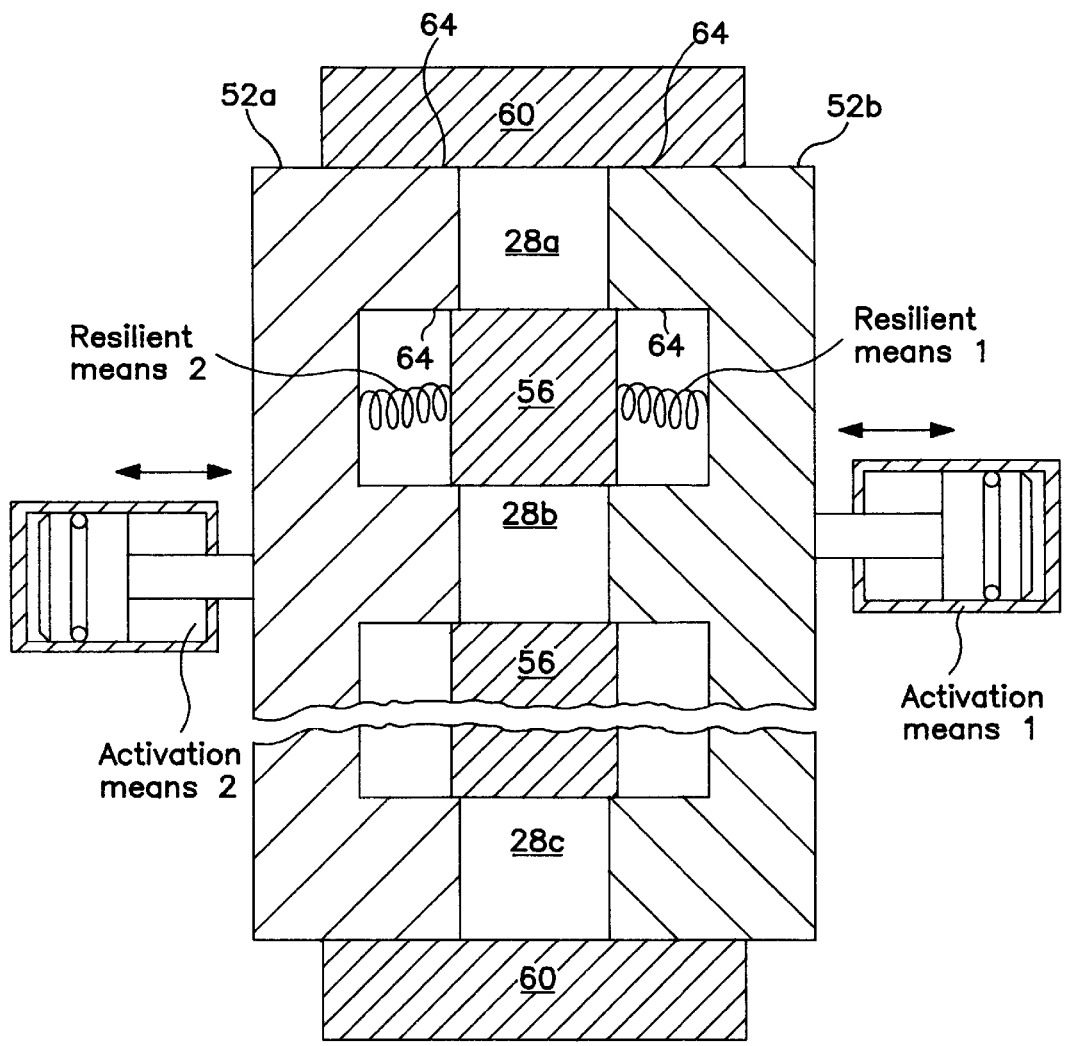
FIG. 2 shows a section taken along line 2—2 of FIG. 1 with gates of square cross-section.

In FIG. 1, shutters 52 are in the open position whereby melt from nozzle assembly 24 can be injected into mold cavity 40 through gate 28 and entrance 48 to mold cavity 40. FIG. 2, which is a section taken along line 2—2 in FIG. 1 shows the relationship between the gates 28a through 28n of an array of N nozzles and shutters 52a and 52b. While the present invention can be employed with a single nozzle assembly 24, it is contemplated that it will be most useful with multi-cavity or large single-cavity molds, wherein a plurality of nozzle assemblies 24 will be employed, each operated by shutters 52.

Figure 2A:
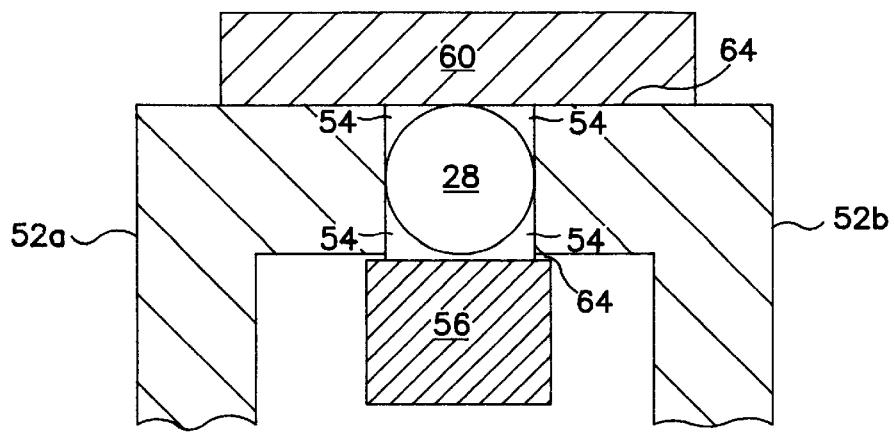
FIG. 2a shows a section taken along line 2—2 of FIG. 1 with a gate of circular cross-section.

In the embodiment shown FIG. 2, gates 28a, 28b and 28n each have a substantially square cross section. FIG. 2a shows the system of FIG. 2 but wherein gate 28 is round in cross-section. In FIG. 2, a seal member 56 is located between each pair of gates 28 and an end seal member 60 is provided against the otherwise open edge of gate 28a and 28n. In the illustrated embodiment, end seal member 60 is a separate piece but it is also contemplated that seal member 60 can be a portion of shutter 52a and/or shutter 52b. As will be apparent to those of skill in the art, the perimeter of gates 28a and 28n are enclosed on one side by end seal member 60, on the next side by shutter 52a, on the next side by seal member 56 and on the last side by shutter 52b. The perimeter of gates 28 between adjacent nozzles, such as gate 28b, are enclosed by seal members 56 and shutters 52a and 52b.

In FIG. 2a, the perimeter of gate 28, and "dead zones" 54 described below, are enclosed by end seal member 60, shutter 52a, seal member 56 and shutter 52b. As shown in this figure, some melt will accumulate at the dead zones. By moving the two shutters 52a and 52b this material is pushed back into the mold or the nozzle. Therefore, no waste will be generated. Any known means such as pneumatic pistons and resilient spring means can activate shutters 52a and 52b.

Figure 3A:
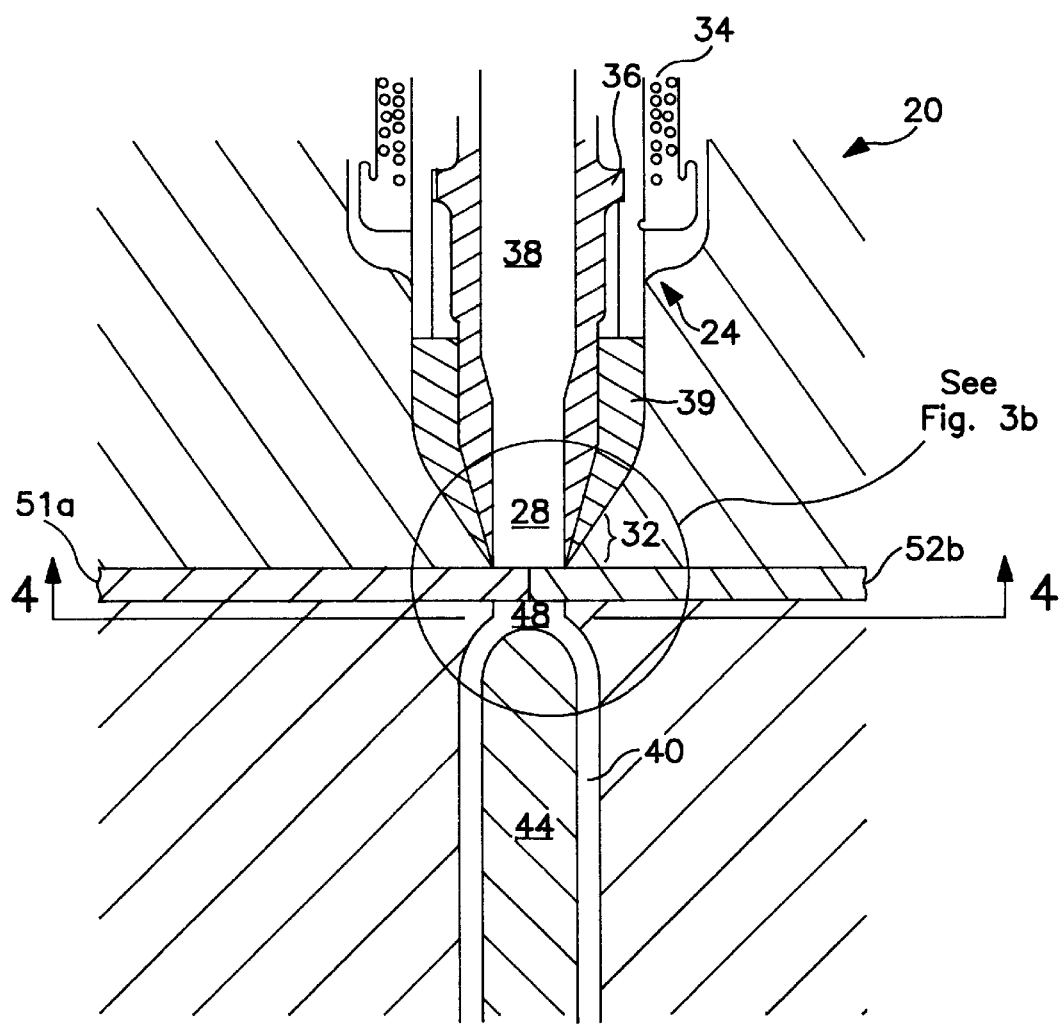
FIG. 3 shows the shutter of FIG. 1 in a closed position.
Figure 3B:
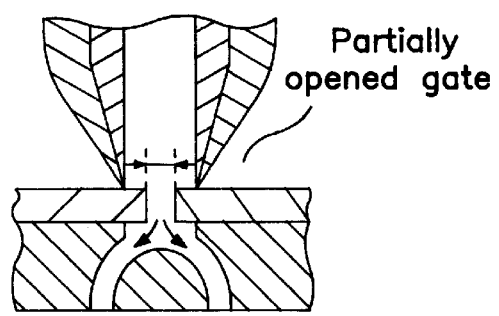

FIG. 3 shows the nozzle of FIG. 1 when shutters 52a and 52b are in the closed position wherein melt from nozzle 36 is prevented from entering entrance 48 to mold cavity 40. FIG. 4 shows a section taken along line 4—4 of FIG. 3 showing how gates 28 are blocked when shutters 52a and 52b are in the closed position. As will be apparent to those of skill in the art, and as is further discussed below, shutters 52a and 52b can be placed in a plurality of positions intermediate the illustrated open and closed positions to "throttle" gate 28 as desired and to thus effectively create a gate of a desired cross-sectional size.

The function of shutters 52a and 52b, when used with a circular gate 28 as shown in FIG. 2a, is essentially the same as when they are employed with gates of square cross-section. As will be apparent to those of skill in the art, when shutters 52a and 52b are in the open position shown in FIGS. 1 and 2, melt material can enter dead zones 54. However, as will also be apparent, as shutters 52*a* and 52*b* are moved to the closed position shown in FIG. 4, melt material is swept out of dead zones 54 into gate 28 and entrance 48 by the leading edge of the shutters 52.

It is contemplated that shutters 52*a* and 52*b*, sealing members 56 and end sealing members 60 can be fabricated from a variety of materials and in a variety configurations. One of the contemplated advantages of the present invention is the thermal isolation which can be achieved between melt in gate 28 and melt in entrance 48 to mold cavity 40. Accordingly, shutters 52, sealing members 56 and end sealing members 60 can be fabricated from a suitable insulating material such as titanium or a ceramic such as zirconia oxide and/or coated with materials with desired heat transfer characteristics. For example, the surface of shutters 52 adjacent gate 28 can be coated with a heat reflective material such as chromium or silver while the surface of shutters 52 adjacent entrance 48 to mold cavity 40 can be coated with a heat conducting material such as copper or stainless steel.

A variety of factors influence the selection of the thickness of shutters 52. Generally, it is desired that shutters 52 are relatively thin to minimize the displacement of melt into nozzle assembly 24 and/or cavity 40 when shutters 52 are moved from the open position to the closed position. As will be apparent to those of skill in the art, shutters 52 will displace melt located between them as they close and this displaced melt will result in back pressure of melt into nozzle assembly 24 and/or cavity 40. The thinner shutters 52 can be made, the less melt is displaced. Conversely, shutters 52 must abut each other in the closed position to provide a reasonable seal against further flow of melt from nozzle assembly 24 to cavity 40 and thus shutters 52 must be sufficiently rigid to ensure sealing abutment occurs. Sufficient rigidity can be achieved in a variety of manners, including fabricating shutters 52 of sufficient gauge (thickness) material to ensure rigidity and/or supporting the side edges 64 of shutters 52 in complementary grooves (not shown) in seal members 56 and/or end seal members 60. In any event, generally the thickness of sealing members 56 and end sealing members 60 will be selected to correspond to the selected thickness of shutters 52.

In the embodiment of FIGS. 1 through 4, and as best seen in FIGS. 1 and 3, the sealing edges 68 of shutters 52*a* and 52*b* are formed perpendicular to the plane of the shutters 52 and this provides a relatively large contact area between the shutters to achieve the desired seal. FIGS. 5(*a*) through 5(*d*) show some of the additional contemplated configurations of the sealing edges 68 of shutters 52. FIG. 5(*a*) shows a configuration wherein sealing edges 68 are wedge-shaped. It is contemplated that this configuration will "cut" melt in gate 28 and will direct any melt displaced by the closing of shutters 52 into mold cavity 40. FIG. 5(*b*) shows a similar, but inverted, configuration that will direct melt displaced by closing of shutters 52 into nozzle assembly 24. FIG. 5(*c*) shows a configuration wherein the sealing edges 68 on each one shutter 52 is complementary to the other shutter 52. In this particular example, shutter 52*b* includes a wedge shaped sealing edge 68*b* which engages a complementary wedge-shaped groove in sealing edge 6*ba* of shutter 52*a*. FIG. 5(*d*) shows sealing edges 68 of shutters 52 with mirror-imaged wedge-like edges and this embodiment can be preferred when it is desired to "throttle" the size of gate 28.

One of the perceived advantages of employing two shutters 52 is that they can be moved to the throttle gate 28 such that the cross-sectional area of the resulting effective gate remains centered under tip 32.

Figure 6:
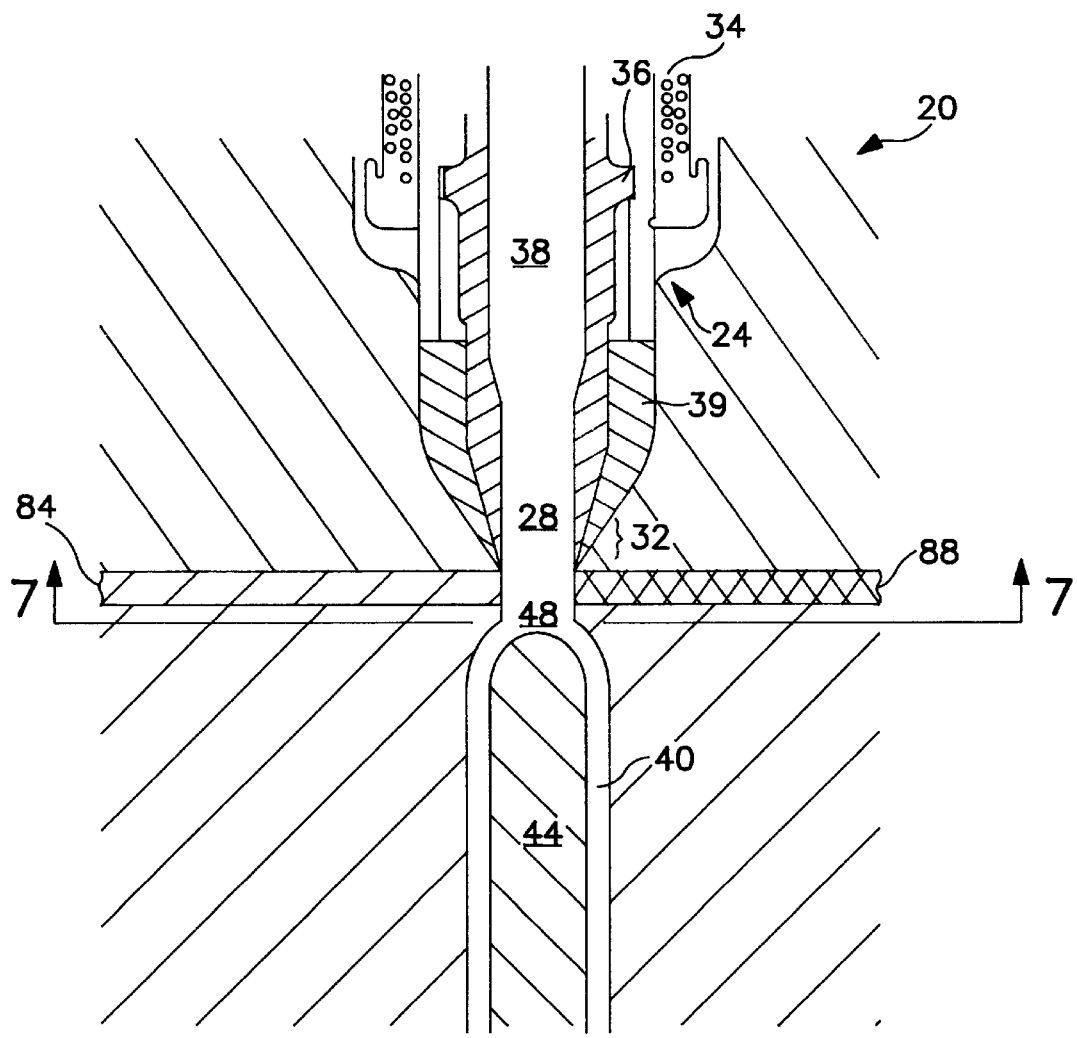
FIG. 6 shows a cross section of a portion of an injection nozzle and a shutter, in accordance with another embodiment of the present invention, adjacent a mold cavity and wherein the shutter is in an open position.
Figure 7:
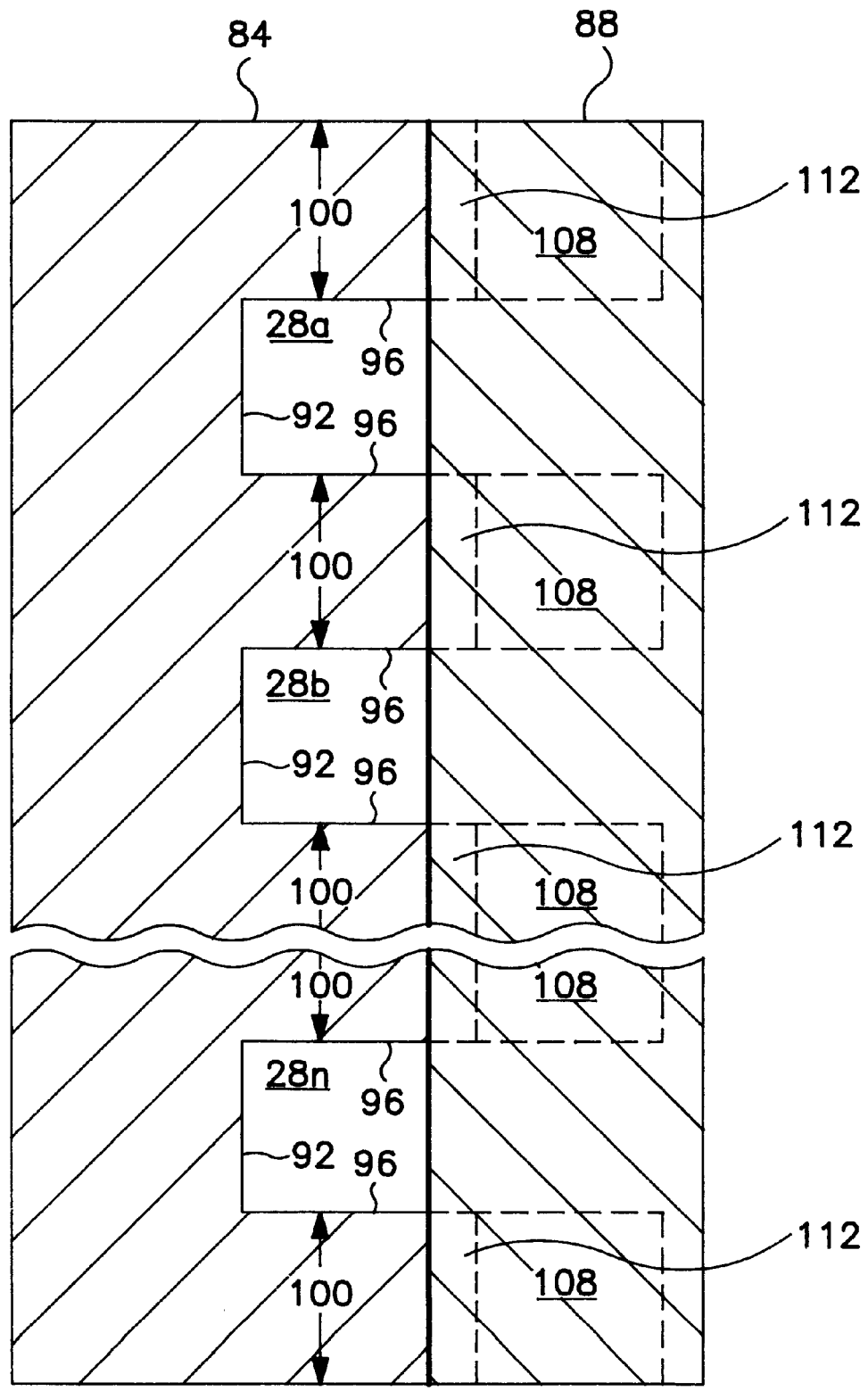
FIG. 7 shows a section taken along line 7—7 of FIG. 6.

FIG. 6 shows another embodiment of the present invention, indicated generally at 80, wherein like components to those shown in FIG. 1 are indicated with like reference numerals. In this embodiment, only a single shutter 84 is employed. FIG. 7, which is a section taken along line 7—7 in FIG. 6, shows the relationship between the gates 28*a* through 28*n* of an array of nozzles and shutter 84. Again, while the present invention can be employed with a single nozzle assembly 24, it is contemplated that it will be most useful with multi-cavity molds or large single-cavity molds wherein a plurality of nozzle assemblies 24 will be employed. As shown in FIGS. 6 and 7, a seal member 88 is provided on the side of gates 28 opposite shutter 84.

As shown, shutter 84 includes seal edges 92 and pairs of side edges 96, which are, formed on seal fingers 100. Seal member 88, which can be a separate member or can be directly formed in manifold plate 104, includes slots 108 into which a portion 112 of seal fingers 100 extend in the illustrated open position.

Figure 8:
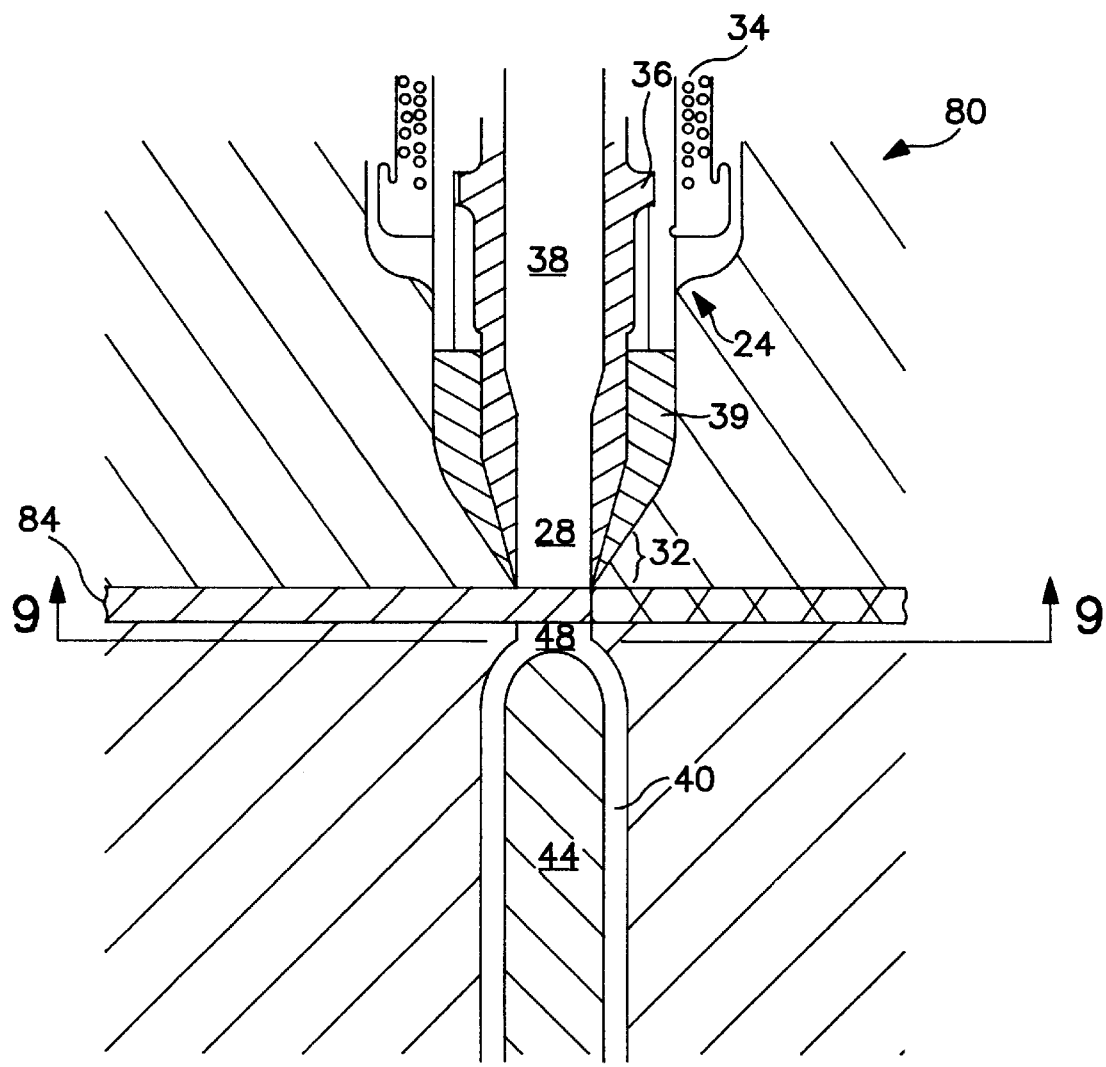
FIG. 8 shows the shutter of FIG. 6 in a closed position.
Figure 9:
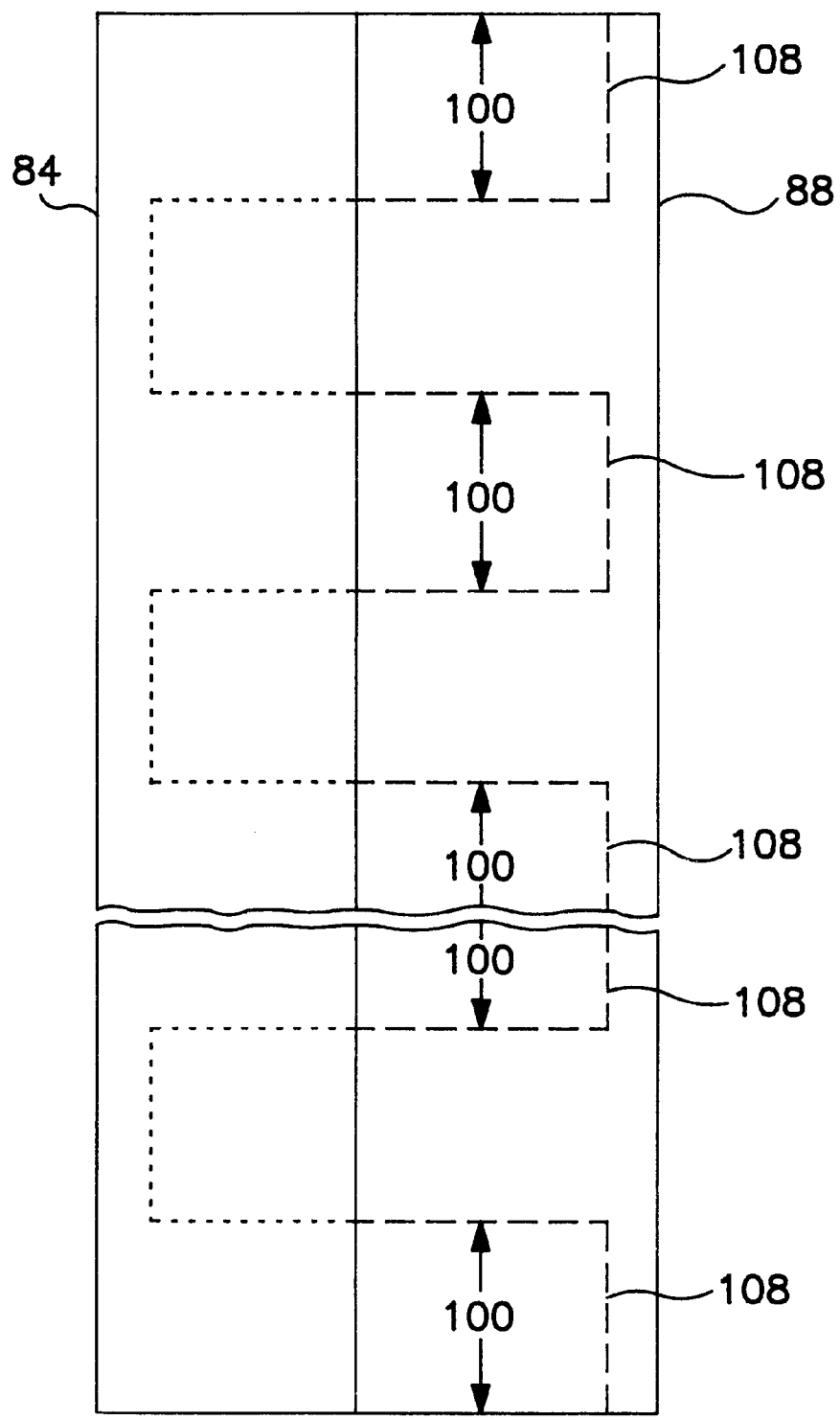
FIG. 9 shows a section taken along line 9—9 of FIG. 8.

In the closed position, shown in FIGS. 8 and 9, shutter 84 is moved such that seal edge 92 abuts against seal member 88 and seal fingers 100 extend into slots 108 as shown. This embodiment is presently believed to provide advantages over that shown in FIGS. 1 through 4 in that only a single shutter 84 must be moved, and seal edges 92 are well supported, throughout their range of movement, by seal fingers 100.

As will be apparent to those of skill in the art, as with the previous embodiments of the present invention, if desired shutter 84 can be placed in any intermediate position between the illustrated open position and the illustrated closed position to provide a gate 28 with a different size, i.e.—a "throttled" gate. Further, shutter 84 can be fabricated from a variety of materials and/or coatings to achieve desired thermal properties and seal edge 92 can have a variety of configurations, as appropriate.

As will also be apparent to those of skill in the art, in the embodiment of FIGS. 6 through 9, gates 28 need not be square in cross-section in this embodiment and can instead be a conventional circular or other cross-section.

Figure 10:
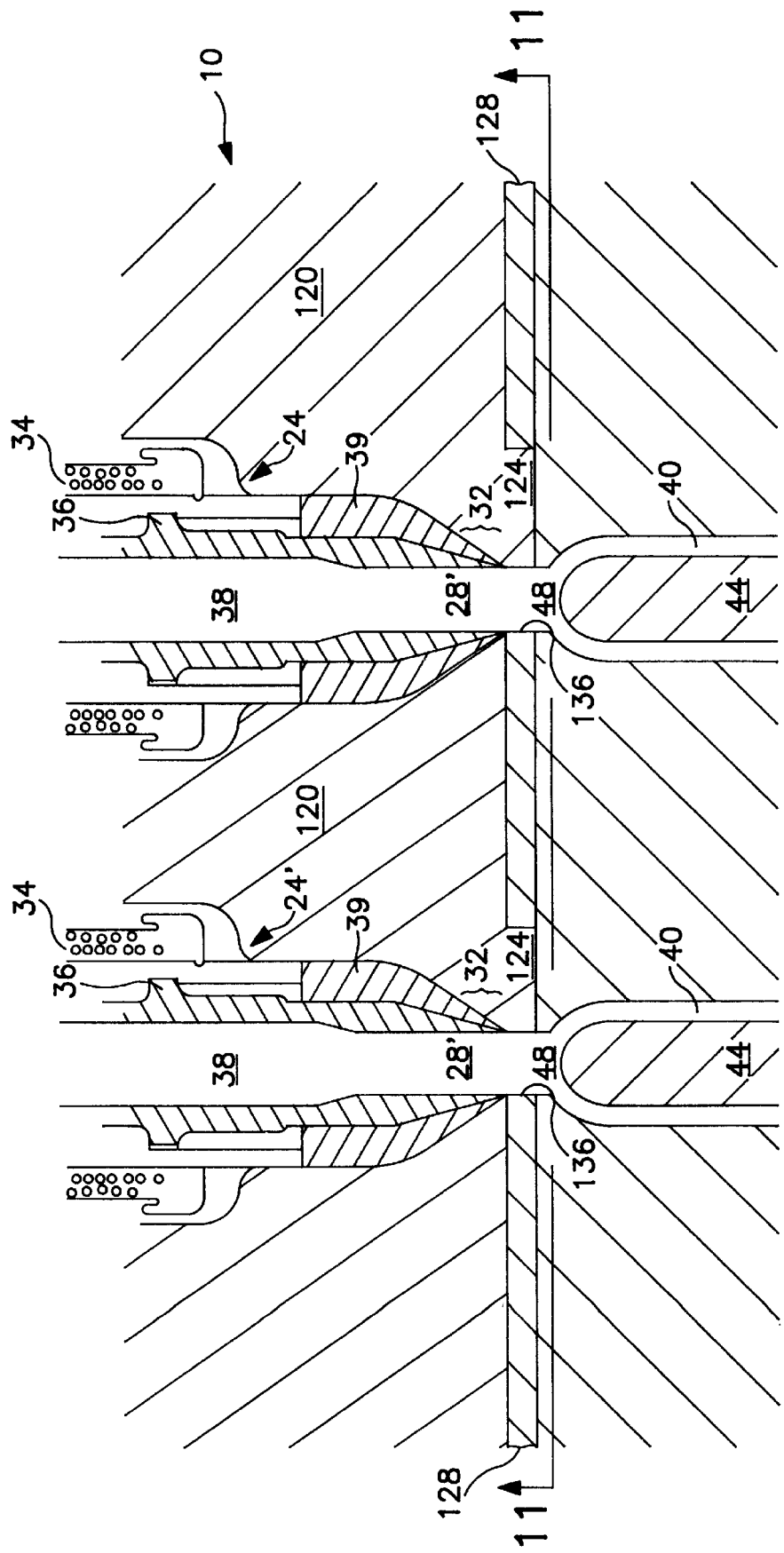
FIG. 10 shows a cross section of two injection nozzles and a shutter in accordance with another embodiment of the present invention and wherein the shutter is in an open position.
Figure 11:
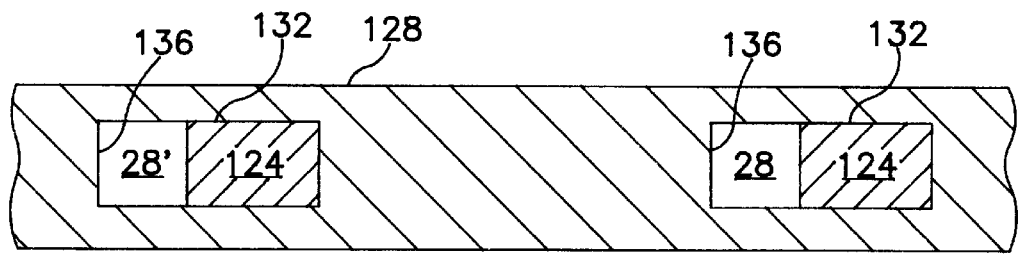
FIG. 11 shows a section taken along line 11—11 of FIG. 10.
Figure 13:
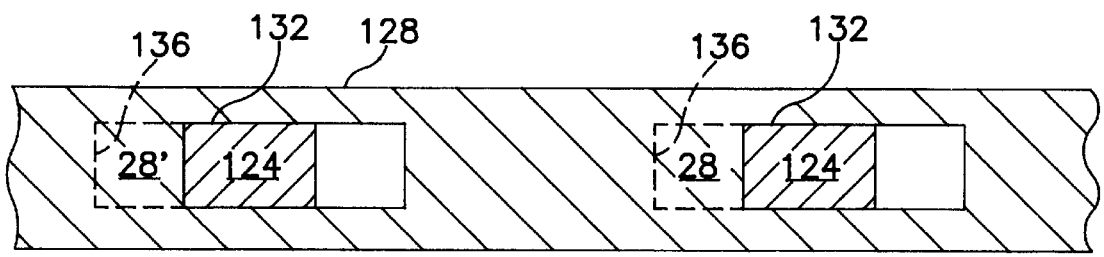
FIG. 13 shows a section taken along line 13—13 in FIG. 12.
Figure 12:
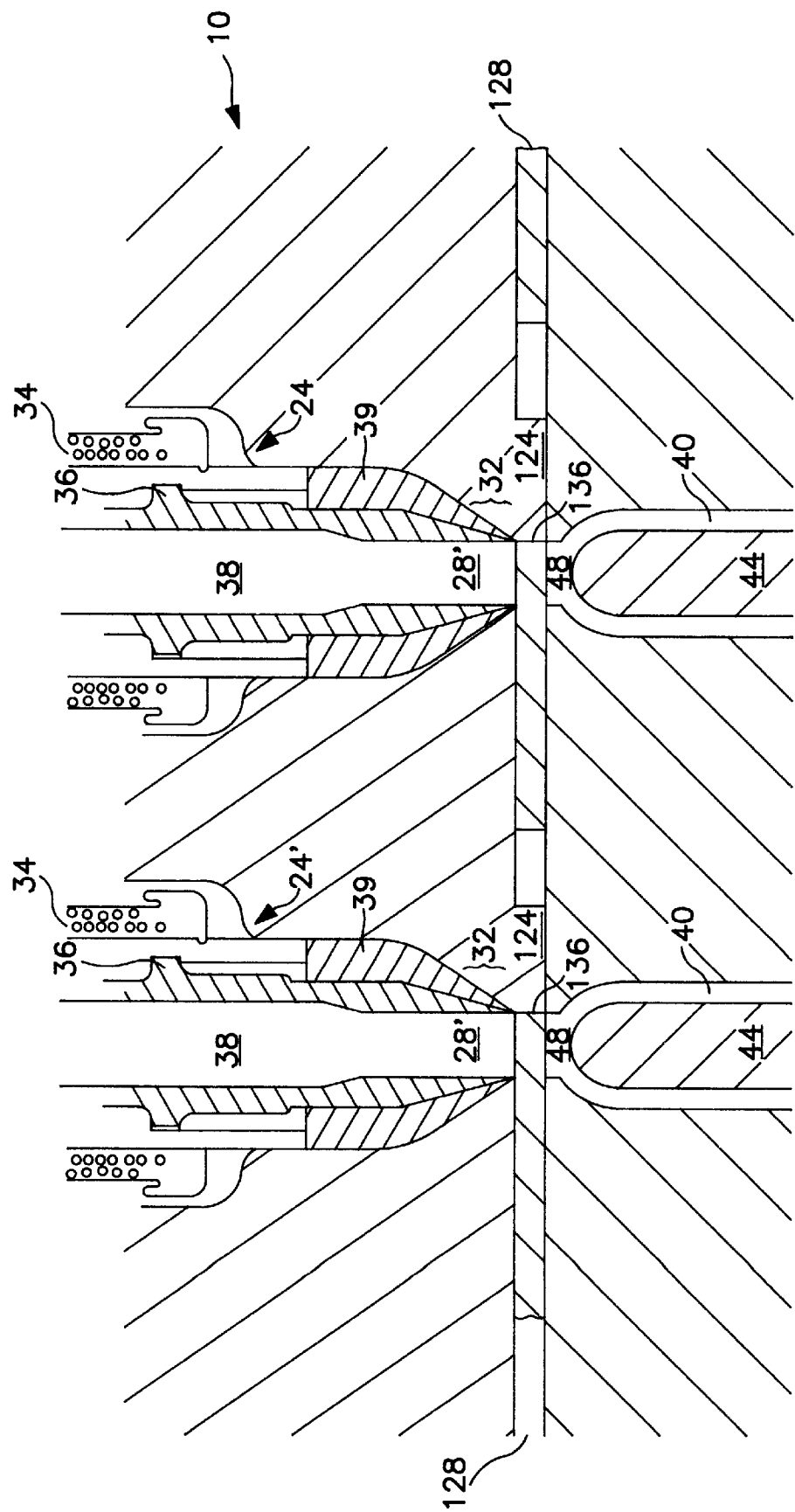
FIG. 12 shows the shutter of FIG. 10 in a closed position.

FIGS. 10 through 13 show the preferred embodiment of the present invention, indicated generally at 110, wherein like components to those shown in FIG. 1 are indicated with like reference numerals. As shown in FIGS. 10 and 11, in this embodiment two nozzle assemblies 24 and 24' are located in manifold plate 120 and are gated by a single shutter 128. For each nozzle 24, 24', manifold plate 120 includes a sealing post 124, which can be integrally formed with plate 120 or which can be affixed thereto by any suitable means as will occur to those of skill in the art. Shutter 128 includes a rectangular slot 132 for each nozzle 24, 24' which is sized to correspond to the width of post 124 and gate 28 as shown and which includes a sealing edge 136. When it is desired to close gates 28 and 28', shutter 128 is moved to bring sealing edge 136 into contact with sealing post 124, as shown in FIGS. 12 and 13. As with the other embodiments of the present invention, shutter 128 can be placed in any desired position intermediate the open position of FIG. 10 and the closed position of FIG. 12 to alter the size of gates 28, 28' i.e.—to throttle gates 28, 28'. If multiple shutters 128 are to be employed, each shutter 128 gating one or more nozzles, they can be connected to a suitable frame allowing them to be moved synchronously between positions by a single actuating means, as described below.

Figure 14:
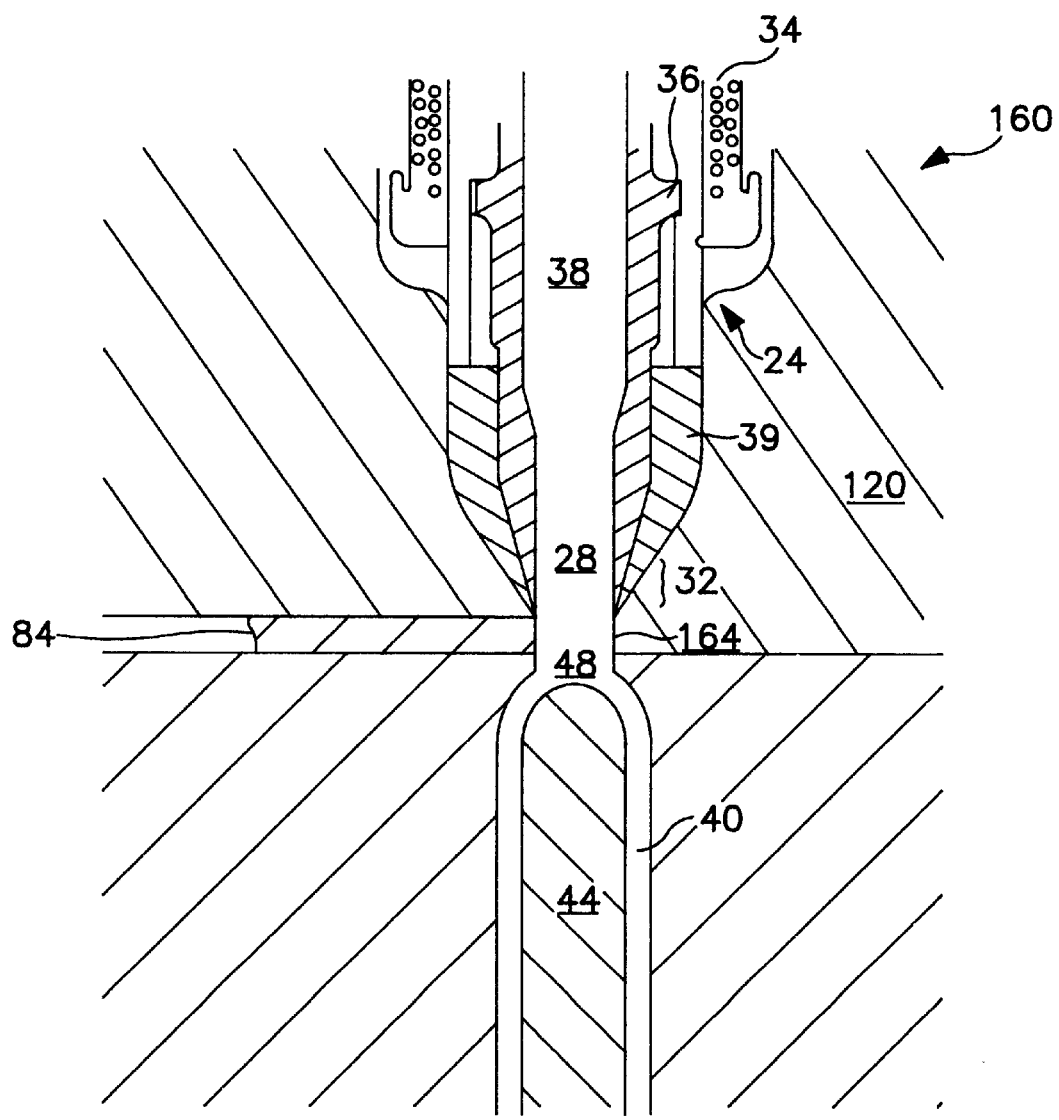
FIG. 14 shows a cross section of a portion of an injection nozzle and a shutter in accordance with another embodiment of the present invention, adjacent a mold cavity and wherein the shutter is in an open position.
Figure 15:
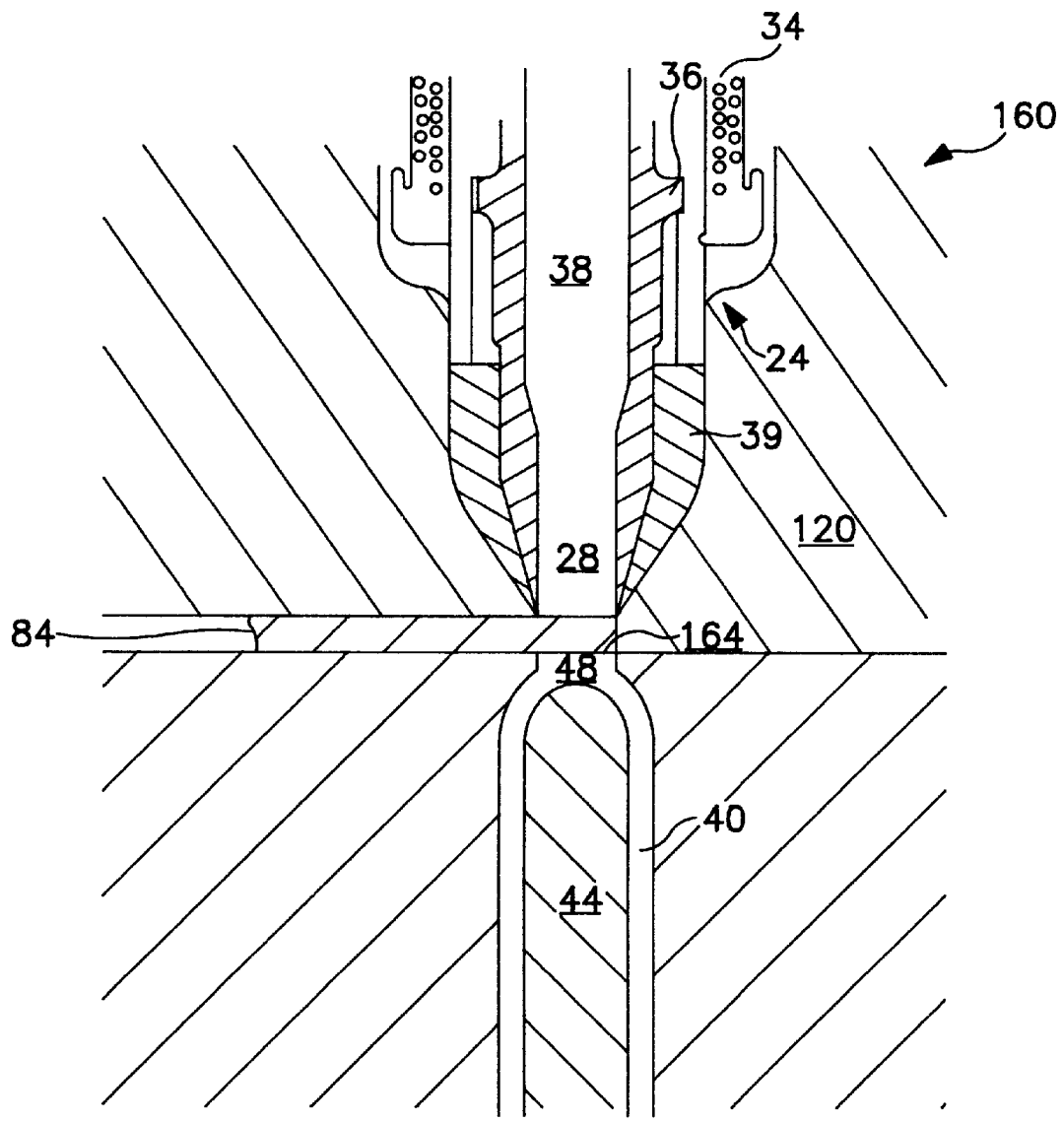
FIG. 15 shows the shutter of FIG. 14 in a closed position.

FIGS. 14 and 15 show another embodiment of the present invention, indicated generally at 160, wherein like components to those shown in FIG. 1 are indicated with like reference numerals. In this embodiment, which is similar to that shown in FIGS. 6 through 8, on one side of gate 28 manifold plate 120 extends toward the mold cavity to form a surface with a edge 164 against which shutter in shutter 84 abuts in the closed position.

Figure 16:
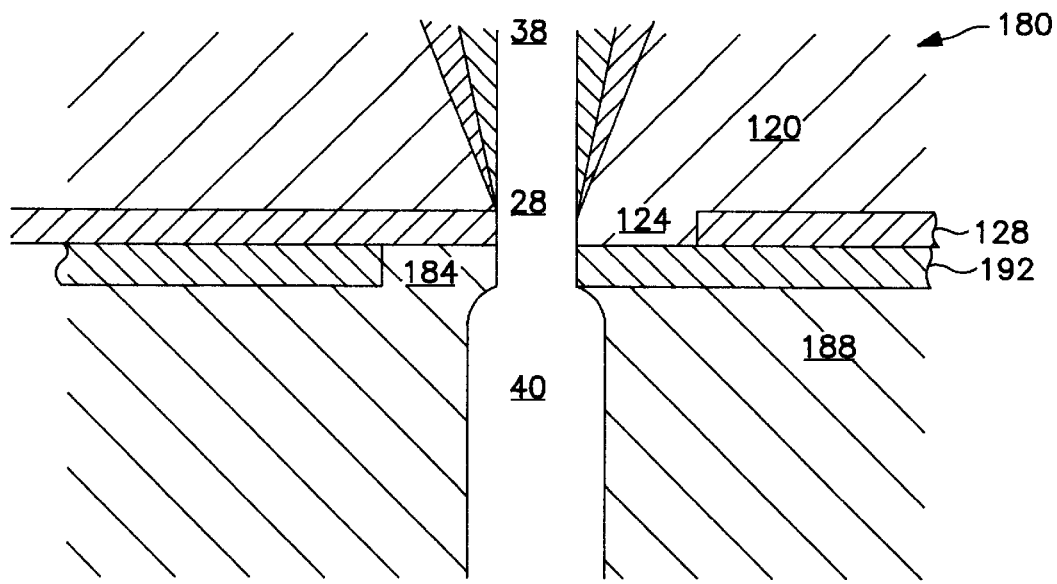
FIG. 16 shows a cross section of a portion of an injection nozzle and a pair of shutters in accordance with another embodiment of the present invention, adjacent a mold cavity and wherein the shutter is in an open position.
Figure 17:
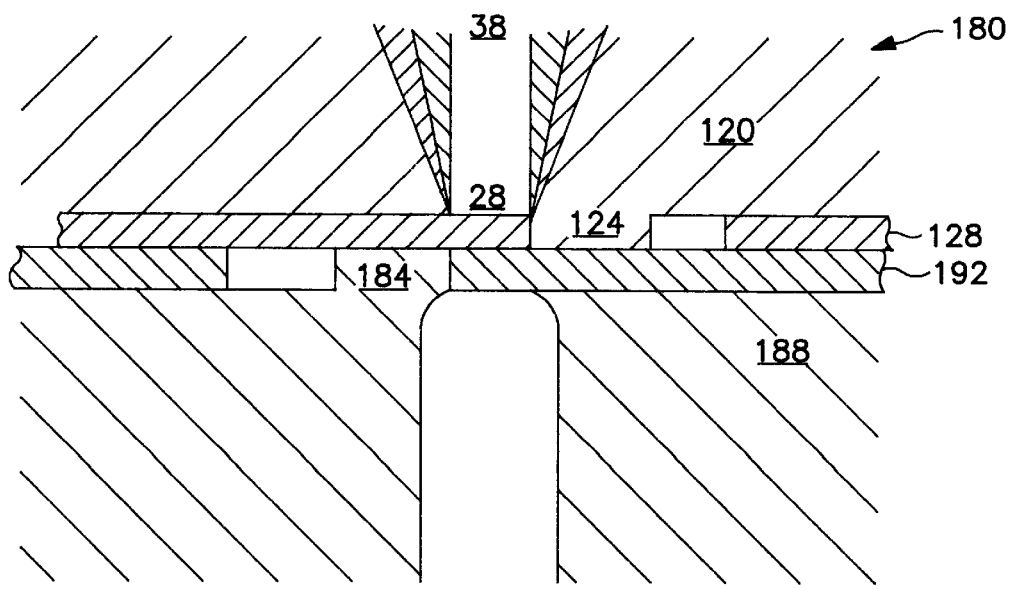
FIG. 17 shows the shutters of FIG. 16 in a closed position.

FIGS. 16 and 17 show another embodiment of the present invention, indicated generally at 180, wherein like components to those shown in FIG. 1 are indicated with like reference numerals. In this embodiment, which is similar to that shown in FIGS. 10 through 13, a sealing post 124 is provided on manifold plate 120 and a second sealing post 184 is provided on cavity plate 188 on the opposite side of gate 28 from sealing post 124. A pair of shutters 128 and 192 are employed, each sealing against a respective one of sealing posts 124 and 184 in the closed position, as shown in FIG. 17. This embodiment allows gate 28 to be located above the center of the through aperture formed by shutters 128, 192 when they are placed in a position intermediate the open and closed positions shown to throttle gate 28. Further, shutter 128 can be fabricated from a material with good thermal insulating properties, such as titanium or a ceramic material, and shutter 12 can be fabricated from a material with good thermal transfer properties to provide the desired thermal characteristics for cooling a part in cavity 40.

As will be apparent to those of skill in the art, the ability to gate multiple nozzles with a single shutter, or pair of shutters, can render the present invention particularly size and cost efficient. Specifically, a shutter, or pair of shutters, require much less volume within an injection mold than many prior art valve gating systems which required separate actuators for each nozzle. Thus, a machine and/or mold designer can employ more nozzles and/or space nozzles more closely, if desired.

Further, the shutters, or pairs of shutters, in accordance with the present invention are less expensive to deploy, due largely to the simplicity of the manufacture of the shutters, and the reduced number of actuators required to operate the shutters. Also, by gating a number of nozzles with a single shutter or pair of shutters, accurate and consistent gating of nozzles can be achieve relatively easily, ensuring that the same amount of melt material is supplied to each mold cavity.

Figure 18:
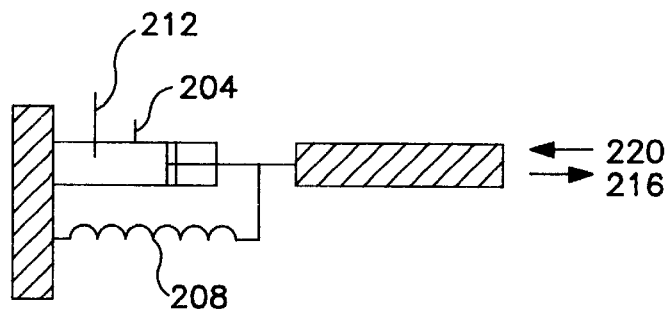
FIG. 18 shows a schematic representation of an embodiment of an actuator to move a shutter in accordance with the present invention.

As will be apparent to those of skill in the art, operation of the shutters of the embodiments of the present invention can be accomplished in a wide variety of manners. For example, as shown schematically in FIG. 18, a shutter 200 can be moved between open, throttled (intermediate) and closed positions by a hydraulic actuator 204 and return spring 208. Hydraulic fluid 212 can be supplied to cylinder 204 by any suitable means to move shutter 200 in the direction of arrow and return spring 208 can move shutter 200 in the direction indicated by arrow 220 when hydraulic pressure is removed from cylinder 204. If more precise positioning is required, such as for throttling of melt flow in a very accurate manner, a mechanical worm drive, a stepper motor or any other suitable means as will occur to those of skill in the art can be employed.

Figure 19:
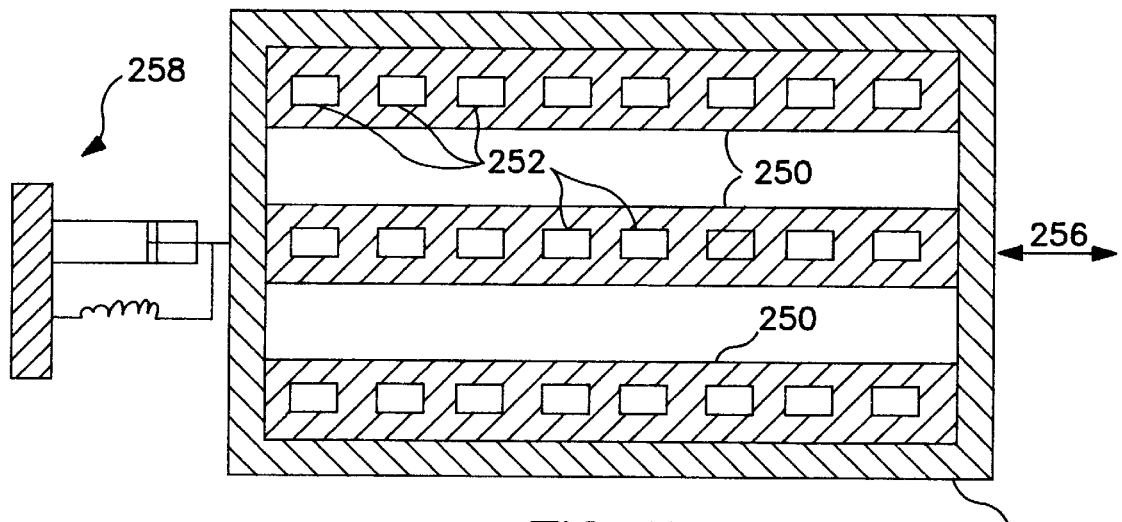
FIG. 19 shows a schematic representation of three shutters mounted in a frame and an actuator to move the frame in accordance with the present invention.

The present invention can be deployed in a variety of manners for multi-nozzle applications. As mentioned above, a shutter or a pair of shutters in accordance with the present invention can act to throttle or valve multiple nozzles. Ii is contemplated that, as shown in FIG. 19, multiple shutters 250 can be mounted to a frame 254 which can then be moved in the direction indicated by arrow 256 by an actuator 258. If pairs of shutters 250 are employed, each having one or more apertures 252, one of each pair of shutters 250 is mounted in a frame 254 and the corresponding other of each pair of shutters 250 is mounted in a second frame 254 and the frames can be moved, as desired, by a corresponding one of a pair of actuators 258.

Figure 20:
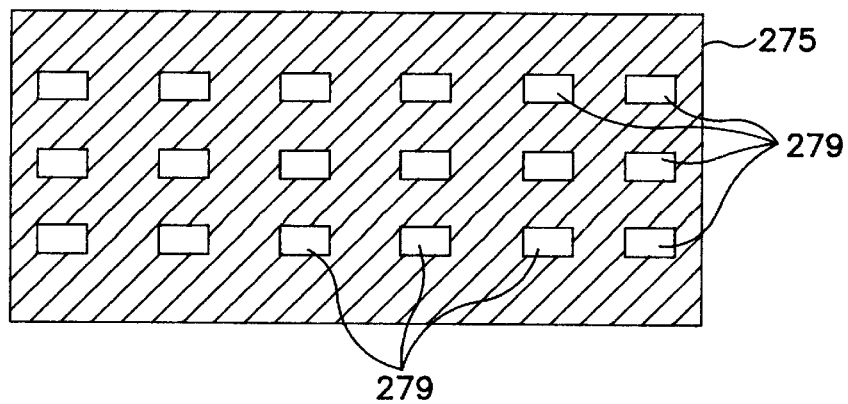
FIG. 20 shows a shutter in accordance with an embodiment of the present invention with a two dimensional array of apertures for gating an array of nozzles.

FIG. 20 shows another embodiment of a shutter 275 in accordance with the present invention for use wherein a series of nozzles to be gated are arranged in an array. As shown in the Figure, shutter 275 is essentially a rectangular plate or sheet in which apertures 279 are formed in an arrangement corresponding to the positioning of the nozzles to be gated. An actuator, not shown, can be connected to shutter 275 in any appropriate manner.

Figure 21:
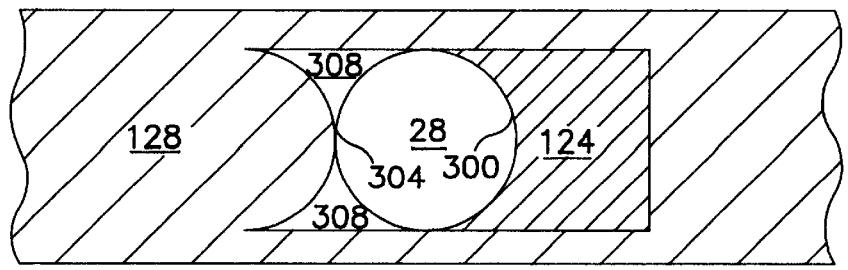
FIG. 21 shows a section similar to that of FIG. 10, but including a circular gate and an appropriate shutter therefore.
Figure 22:
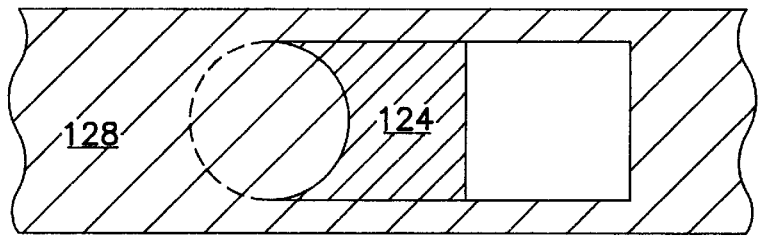
FIG. 22 shows the shutter of FIG. 21 in the closed position.

FIGS. 21 and 22 show another embodiment of the present invention which is similar to that discussed above with reference to FIGS. 10 through 14, but wherein gate 28 is circular. As shown in FIG. 21 wherein shutter 128 is in the open position, sealing post 124 includes a semi-circular edge 300 which corresponds to the adjacent edge of gate 28. The leading edge 304 of shutter 128 is a complementary semi-circular shape which engages edge 300 in the closed position shown in FIG. 22 to seal gate 28 as shown. As will be apparent to those of skill in the art, the semi-circular shape of edge 304 creates dead zones 308 into which melt can enter when an injection operation is performed, but such melt is swept from dead zones 304 when shutter 128 is moved to the closed position.

Figure 23:
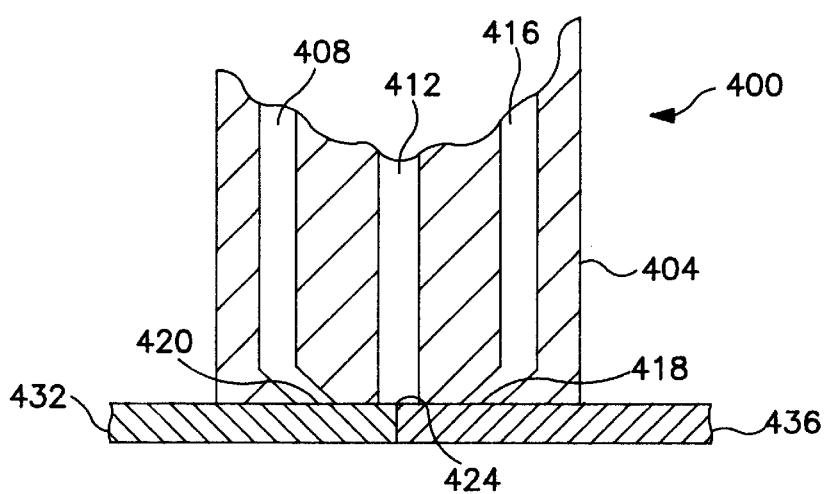
FIG. 23 shows a pair of shutters in the closed position to gate a three-melt channel nozzle.
Figure 24:
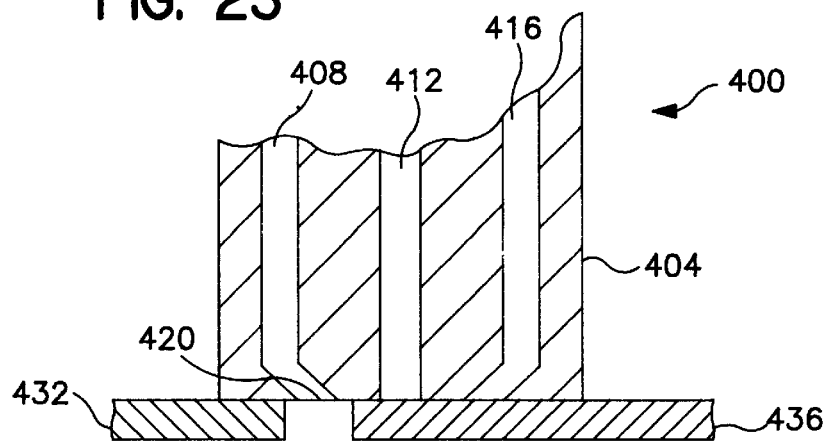
FIG. 24 shows the shutters of FIG. 23 in a position wherein one gate of the three-melt channel nozzle is open and two gates are closed.

FIG. 23 shows a dual shutter embodiment of the present invention, indicated generally at 400, with a nozzle 404 having three melt channels 408, 412 and 416. Each melt channel can supply one of a different melt material to gates 420, 424 and 428. Two shutters 432 and 436 are in the closed position in FIG. 28 wherein all three gates 420, 424 and 428 are closed. In FIG. 24, shutter 432 has been moved to the left, and shutter 436 has also been moved to the left, but to a lesser extent so that gate 420 is now open while gates 424 and 428 remain closed. As will be apparent to those of skill in the art, by properly positioning shutters 432 and 436 gates 420, 424 and 428 can be closed or one, any adjacent two, or all three of gates 420, 424 and 428 can be open, as desired. Further, shutters 432 and 436 can be positioned to throttle one or more of gates 420, 424 and 428, if desired. This novel design can be applied to form multi-layer preforms where one material could be virgin PET, and the second material could be recycled PET, and the third material could be a barrier such as EVOH. A manifold and injection molding machine operative with these nozzles is described in U.S. Pat. No. 4,863,665, incorporated herein by reference. The same approach could be used with a nozzle having two melt channels for two different materials.

Figure 25:
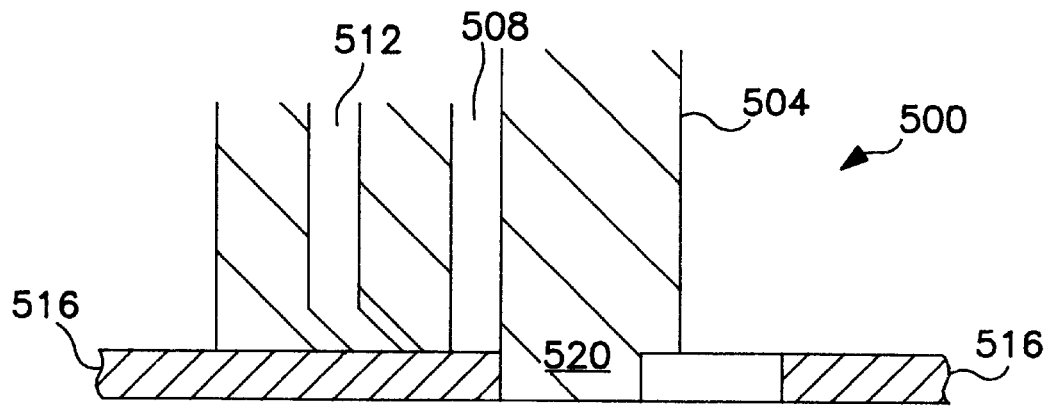
FIG. 25 shows a single shutter for use with a two-melt channel nozzle in the closed position.
Figure 26:
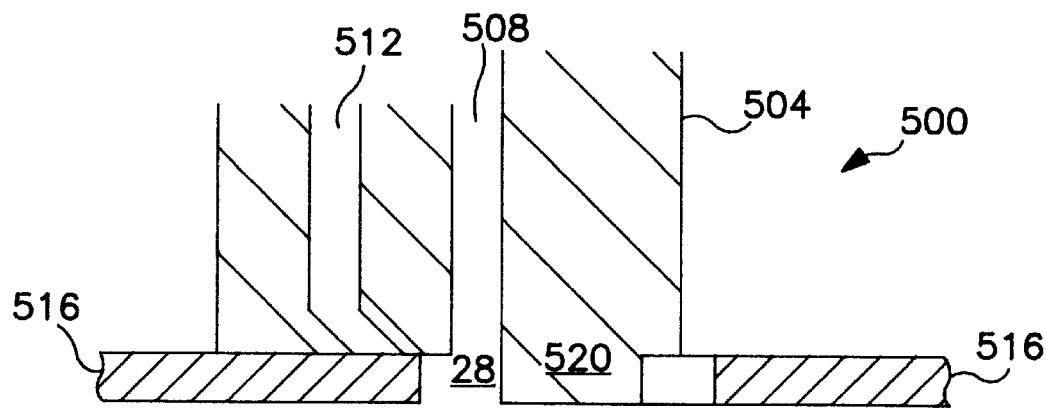
FIG. 26 shows the shutter of FIG. 25 in a first open position.
Figure 27:
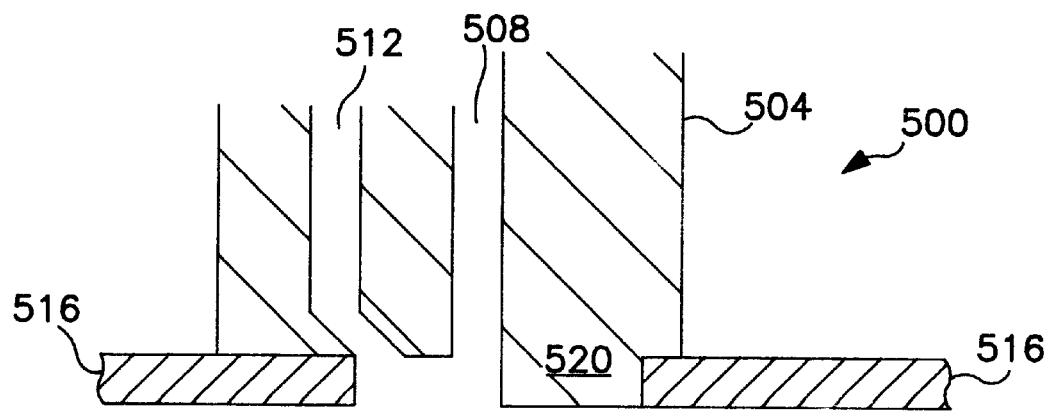
FIG. 27 shows the shutter of FIG. 25 in a second open position.

FIGS. 25, 26 and 27 show another embodiment of the present invention, indicated generally at 500, wherein a two material nozzle 504 includes a first melt channel 508 and a second melt channel 512. This embodiment can be used to valve injection operations wherein a first amount of the melt material in melt channel 508 is injected and then an amount of both the melt material in melt channel 508 and the melt material in channel 512 is simultaneously injected. FIG. 25 shows the embodiment in the closed position wherein a shutter 516, similar to that shown in FIG. 10, is in the closed position and abuts a sealing post 520. FIG. 26 shows the embodiment in position for the first injection operation wherein shutter 516 has been moved to open communication between melt channel 508 and gate 28. FIG. 27 shows the embodiment in position for the second injection operation wherein shutter 516 has been moved to open communication between both melt channels 508 and 512 and gate 28 for a simultaneous injection of melt materials. As will be apparent to those of skill in the art, if desired shutter 516 can be placed in intermediate positions wherein (i) melt channel 508 is throttled and melt channel 512 is closed and (ii) melt channel 508 is open and melt channel 512 is throttled.

While the embodiment of FIGS. 25 through 27 shows a shutter and a sealing post, it will be apparent to those of skill in the art that others of the embodiments described above can be employed with two melt channel nozzles, as desired.

The present invention provides a novel valve gating apparatus and method of operating an injection mold. Thermal insulating properties can be enhanced between cooling melt in the mold cavity and hot melt in the injection nozzle and sprue vestiges can be reduced or eliminated. The valves constructed in accordance with the present invention have good reliability and are not subject to exceptional wear. Further, in at least circumstances wherein multiple nozzles are to be gated, the present invention can be implemented in a relatively compact area and relatively less expensively than prior art systems which required a valve stem for each nozzle.

The above-described embodiments of the invention are intended to be examples of the present invention and alterations and modifications may be effected thereto, by those of skill in the art, without departing from the scope of the invention which is defined solely by the claims appended hereto.

We claim:

1. A valve gating apparatus for a hot runner injection molding assembly having at least one injection molding nozzle mounted in a manifold plate and including a melt channel and a nozzle gate, said valve gating apparatus being positioned between the nozzle gate and a mold cavity, comprising:

at least one shutter positioned between said manifold plate and said manifold cavity and movable between a first position wherein said shutter inhibits flow of melt material from said nozzle gate and a second position wherein said nozzle gate is in fluid communication with said mold cavity, said shutter having a body with an aperture therethrough defining a melt flow path and a sealing edge, said aperture receiving a sealing post adjacent said nozzle gate therein, said sealing edge of said shutter abutting said sealing post in said second position to inhibit flow of melt and said sealing edge being distal said sealing post in said first position; and, means to move said shutter substantially perpendicular to the direction of melt flow through said nozzle gate between said first and second positions.

2. The valve gating apparatus defined in claim 1 wherein said means to move is further operable to move said shutter to a position intermediate said first and second positions to throttle melt flow through said nozzle gate.

3. The valve gating apparatus defined in claim 1 wherein said aperture is substantially rectangular and said sealing edge is a straight edge.

4. The valve gating apparatus defined in claim 1 wherein said sealing edge of said aperture is semicircular and said sealing post includes a complementary semicircular surface against which said sealing surface abuts in said second position.

5. The valve gating apparatus of claim 1 wherein said shutter includes at least two apertures for gating a corresponding number of injection nozzles, each said aperture receiving a respective sealing post associated with a corresponding nozzle and said sealing edge of each said aperture abutting each respective sealing post in said second position.

6. The valve gating apparatus defined in claim 5 wherein said sealing edge of each said aperture is semicircular and each said sealing post includes a complementary semicircular surface against which said sealing surface abuts in said second position.

7. The valve gating apparatus as defined in claim 1 wherein said sealing edge includes an inclined portion to cut said melt material as said shutter is moved into said second position.

8. The valve gating apparatus as defined in claim 1 wherein said nozzle includes two melt channels and wherein said means to move can position said shutter intermediate said first and second positions such that a first melt channel is in fluid communication with said mold cavity and said flow of melt from said second melt channel is inhibited.

9. The valve gating apparatus according to claim 1 further including a second shutter with an aperture therethrough and a sealing post on a mold cavity plate adjacent the entrance to said mold cavity on the opposite side of said nozzle from said sealing post adjacent said nozzle, said second shutter including a sealing edge to abut said second sealing post in said second position and said means to move operable to move said shutter and said second shutter in reciprocal directions between said first and second positions.

10. The valve gating apparatus of claim 9 wherein said shutter is formed of a material with thermal insulating properties and said second shutter is formed of a material with thermal transmissive properties.

11. A valve gating apparatus for a hot runner infection molding assembly having at least one injection molding nozzle mounted in a manifold plate and including a melt channel and a nozzle gate, said valve gating apparatus being positioned between the nozzle sate and a mold cavity, comprising:

two shutters Positioned between said manifold plate and said mold cavity and moveable between a first position wherein said shutter inhibits flow of melt material from said nozzle gate and a second position wherein said nozzle sate is in fluid communication with said mold cavity;

means to move said shutters substantially perpendicular to the direction of melt flow through said nozzle gate between said first and second positions, said means to move moving each one shutter into sealing abutment with the other one shutter in said second position and moving one said shutter in a first direction and the other said shutter in an opposite direction to move said shutters to respective first positions wherein said nozzle gate is in fluid communication with said mold cavity.

12. The valve gating apparatus as defined in claim 11 wherein said nozzle gate is circular.

13. The valve gating apparatus as defined in claim 11 and wherein said nozzle includes at least two melt channels, said means to move operable to position said shutters in said second position wherein that no melt channel is in fluid communication with said mold cavity and in said first position wherein each melt channel is in fluid communication with said mold cavity and in intermediate positions wherein one or more adjacent melt channels are in fluid communication with said mold cavity.

14. The valve gating apparatus as defined in claim 11 wherein at least one of said two shutters includes an edge with an inclined portion to cut said melt material as said two shutters are moved into said second position.

* * * * *

UNITED STATES PATENT AND TRADEMARK OFFICE
CERTIFICATE OF CORRECTION

PATENT NO. : 6,056,536
DATED : May 2, 2000
INVENTOR(S) : Robert D. Schad et al.

Page 1 of 1

It is certified that error appears in the above-identified patent and that said Letters Patent is hereby corrected as shown below:

Column 6,
Line 27, "28n" should read -- 28c --.

Column 11,
Line 44, "second" should read -- first --.
Line 46, "first" should read -- second --.
Line 60, "second" should read -- first --.
Line 67, "second" should read -- first --.

Column 12,
Line 5, "second" should read -- first --.
Line 8, "second" should read -- first --.
Line 34, "sate" should read -- gate --.
Line 40, "sate" should read -- gate --.
Line 45, delete "moving".
Line 46, "second" should read -- first --.
Line 49, "first" should read -- second --.
Line 56, "second" should read -- first --.
Line 57, "first" should read -- second --.
Line 65, "second" should read -- first --.

Signed and Sealed this

Thirtieth Day of April, 2002

Attest:

JAMES E. ROGAN
Director of the United States Patent and Trademark Office

Attesting Officer